US012810202B2

(12) United States Patent
Okuno et al.

(10) Patent No.: US 12,810,202 B2
(45) Date of Patent: Nov. 24, 2026

(54) INFORMATION PROCESSING METHOD, INFORMATION PROCESSING SYSTEM, AND RECORDING MEDIUM

(71) Applicant: Panasonic Intellectual Property Corporation of America, Torrance, CA (US)

(72) Inventors: Tomoyuki Okuno, Osaka (JP); Yohei Nakata, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 582 days.

(21) Appl. No.: 18/243,375

(22) Filed: Sep. 7, 2023

(65) Prior Publication Data

US 2023/0419177 A1 Dec. 28, 2023

Related U.S. Application Data

(63) Continuation of application No. PCT/JP2022/006114, filed on Feb. 16, 2022.

(60) Provisional application No. 63/162,751, filed on Mar. 18, 2021.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ...... G06N 3/0464; G06N 3/0495; G06N 3/09; G06N 3/094; G06N 3/045
See application file for complete search history.

(56) References Cited

U.S. PATENT DOCUMENTS

| | | | | |
|---|---|---|---|---|
| 2016/0328644 A1 | 11/2016 | Lin et al. | | |
| 2018/0025271 A1* | 1/2018 | Sawada | .................. | G06N 3/045 706/25 |
| 2019/0294986 A1* | 9/2019 | Guttmann | .............. | G06N 5/025 |

(Continued)

OTHER PUBLICATIONS

Extended European Search Report issued Jul. 25, 2024 in corresponding European Patent Application No. 22770986.2.

(Continued)

*Primary Examiner* — Beemnet W Dada
(74) *Attorney, Agent, or Firm* — Wenderoth, Lind & Ponack, L.L.P.

(57) ABSTRACT

An information processing method includes obtaining a first inference result by a first inference model, obtaining a second inference result by a second inference model, and training the second inference model by machine learning to reduce an error calculated from the first inference result and the second inference result. The second inference model includes (a) a first coefficient pertaining to a domain and used for inference by the second inference model and (b) a second coefficient used for inference by the second inference model. The training includes; when it is determined that a predetermined condition is not satisfied, training the second inference model with the first coefficient and the second coefficient designated as targets for an update; and when it is determined that the predetermined condition is satisfied, training the second inference model with the second coefficient designated as a target for an update.

11 Claims, 9 Drawing Sheets

(56) References Cited

U.S. PATENT DOCUMENTS

| | | | | |
|---|---|---|---|---|
| 2020/0097841 | A1* | 3/2020 | Petousis | H03M 7/30 |
| 2020/0287983 | A1* | 9/2020 | Sheriff | H04L 67/562 |
| 2021/0232950 | A1* | 7/2021 | Kono | G06N 20/20 |
| 2023/0344972 | A1* | 10/2023 | Okuno | H04N 9/3188 |

OTHER PUBLICATIONS

Zeming Li et al., "Momentum2 Teacher: Momentum Teacher with Momentum Statistics for Self-Supervised Learning", arxiv.org Cornell University Library, 201 Olin Library Cornell University Ithaca, NY, Jan. 2021.

International Search Report (ISR) issued on May 10, 2022 in International (PCT) Application No. PCT/JP2022/006114.

Yanghao Li, et al., "Revisiting Batch Normalization for Practical Domain Adaptation", arXiv: 1603.04779v4 [cs.CV], Nov. 2016.

Jing Yang, et al., "Knowledge distillation via adaptive instance normalization", arXiv: 2003.04289v1 [cs.CV], Mar. 2020.

Raghuraman Krishnamoorthi, "Quantizing deep convolutional networks for efficient inference: A whitepaper", arXiv:1806.08342v1 [cs.LG], Jun. 2018.

* cited by examiner

INFORMATION PROCESSING METHOD, INFORMATION PROCESSING SYSTEM, AND RECORDING MEDIUM

CROSS REFERENCE TO RELATED APPLICATIONS

This is a continuation application of PCT International Application No. PCT/JP2022/006114 filed on Feb. 16, 2022, designating the United States of America, which is based on and claims priority of U.S. Provisional Patent Application No. 63/162,751 filed on Mar. 18, 2021. The entire disclosures of the above-identified applications, including the specifications, drawings and claims are incorporated herein by reference in their entirety.

FIELD

The present disclosure relates to an information processing method, an information processing system, and recording medium.

BACKGROUND

There exists a technique of converting an inference model of a floating point representation to an inference model of a fixed point representation based on a system's computation resources and performance specifications (see Patent Literature (PTL) 1).

There also exists a technique of, if data obtained in different environments (domains) are input to an inference model, reducing the difference in inference performance by using, as statistical values to be used for normalization by Batch Normalization layers included in the inference model, statistical values calculated in advance for each domain (see Non Patent Literature (NPL) 1).

CITATION LIST

Patent Literature

PTL 1: U.S. Patent Application Publication No. 2016/0328644

Non Patent Literature

NPL 1: Yanghao Li et al., Revisiting Batch Normalization For Practical Domain Adaptation, ArXiv: 1603.04779, 2016.

SUMMARY

Technical Problem

The technique disclosed in PTL 1 above, however, has shortcomings in that, although the inference performance can be retained after the conversion of an inference model, a difference may arise between an inference result that is based on a converted inference model and an inference result that is based on an unconverted inference model.

Furthermore, the technique disclosed in NPL 1 above faces a problem in that, depending on a change in a domain, optimizing statistical values for use in the normalization by BN layers makes it difficult to simultaneously optimize coefficients other than the coefficients included in the inference model, which may stop the progress of training by a machine learning process.

Accordingly, the present disclosure provides an information processing method that improves the degree of match between an inference result that is based on an unconverted inference model and an inference result that is based on a converted inference model.

Solution to Problem

An information processing method according to one aspect of the present disclosure includes: obtaining a first inference result by inputting data into a first inference model; obtaining a second inference result by inputting the data into a second inference model; and training the second inference model by machine learning to reduce an error calculated from the first inference result and the second inference result, wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the training includes: determining whether a predetermined condition associated with convergence of the first coefficient is satisfied; when it is determined that the predetermined condition is not satisfied, training the second inference model with the first coefficient and the second coefficient designated as targets for an update; and when it is determined that the predetermined condition is satisfied, training the second inference model with, of the first coefficient and the second coefficient, the second coefficient alone designated as a target for an update.

It is to be noted that general or specific aspects of the above may be implemented in the form of a system, an apparatus, an integrated circuit, a computer program, or a computer readable recording medium, such as a CD-ROM, or through any desired combinations of a system, an apparatus, an integrated circuit, a computer program, and a recording medium.

Advantageous Effects

An information processing method according to the present disclosure can improve the degree of match between an inference result that is based on an unconverted inference model and an inference result that is based on a converted inference model.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
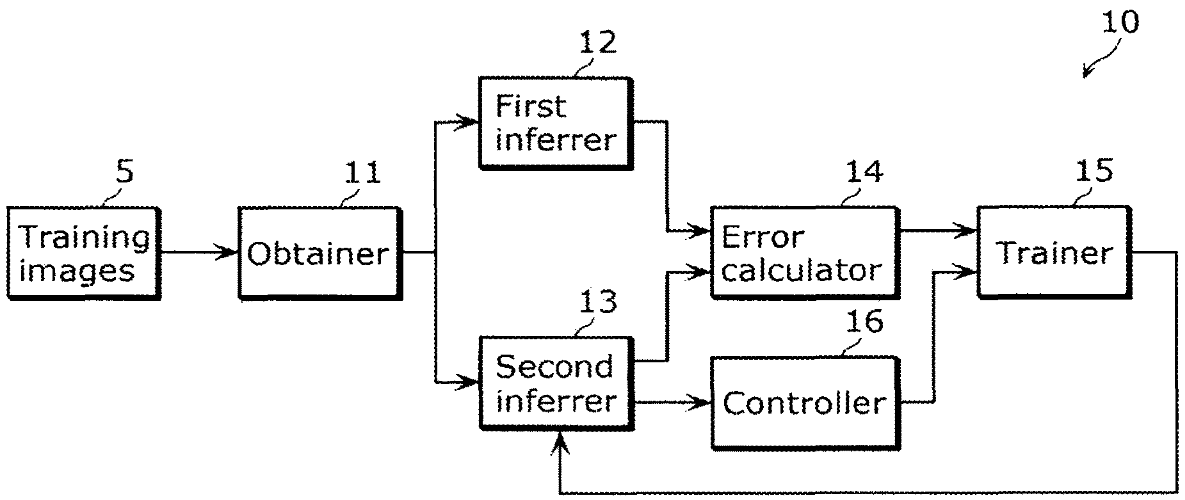
FIG. 1 is a block diagram showing a configuration of an information processing system according to Embodiment 1.

DESCRIPTION OF EMBODIMENTS (Underlying Knowledge Forming Basis of the Present Disclosure)

The present inventors have found that the following problems arise with respect to the techniques of converting an inference model described in Background Art.

There exists a technique of converting an inference model of a floating point representation to an inference model for an embedded environment of a fixed point representation based on a system's computation resources and performance specifications (see PTL 1).

An inference model of a floating point representation is generated, for example, through training by machine learning with the use of a computer having high-performance computation resources. An inference process using a network of a floating point representation is expected to be executed on a computer (an electrical home appliance, an in-vehicle device, or the like) having limited computation resources.

On a computer having limited computation resources, executing an arithmetic operation process of numerical values of a floating point representation may be difficult. Therefore, it is conceivable to convert an inference model of a floating point representation to an inference model of a fixed point representation and to execute an inference process with the use of the converted inference model of a fixed point representation on a computer with limited computation resources.

There arises an issue, however, in that, although the inference performance can be retained after the conversion of an inference model, a difference may arise between the behaviors of the unconverted inference model and the behaviors of the converted inference model. In other words, there is an issue in that a difference may arise between an inference result that is based on a converted inference model and an inference result that is based on an unconverted inference model. Herein, the inference performance is the degree of accuracy or correctness of an inference result with respect to correct data and is, for example, the percentage of the inference results being correct with respect to the total input data. Herein, if there are a plurality of items to be inferred with respect to one item of input data, the inference performance may be the percentage of being correct the inference results for the plurality of items to be inferred with respect to the one item of input data.

Meanwhile, in the technique disclosed in NPL 1, if data (e.g., images) of different environments (also referred to as domains) are to be input to an inference model during training than during inference, statistical values calculated in advance for each domain are used as statistical values to be used for the normalization by Batch Normalization layers (also referred to as BN layers) included in the inference model. This configuration can reduce, to a certain degree, the difference in inference performance even if the domain of the input data is different during training than during inference.

However, depending on a change in a domain, optimizing statistical values for use in the normalization by BN layers makes it difficult to simultaneously optimize coefficients other than the coefficients included in the inference model, which may stop the progress of training by a machine learning process. For example, if an inference model of a floating point representation is to be converted to an inference model of a fixed point representation, a change in the statistical values to be used for the normalization by the BN layers changes the conversion process described above, and this change leads to a change in the optimal values of the coefficients included in the inference model. Thus, the progress of the training may be hindered.

Accordingly, the present disclosure provides an information processing method that improves the degree of match between an inference result that is based on an unconverted inference model and an inference result that is based on a converted inference model.

To address such an issue, an information processing method according to one aspect of the present disclosure includes: obtaining a first inference result by inputting data into a first inference model; obtaining a second inference result by inputting the data into a second inference model; and training the second inference model by machine learning to reduce an error calculated from the first inference result and the second inference result, wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the training includes: determining whether a predetermined condition associated with convergence of the first coefficient is satisfied; when it is determined that the predetermined condition is not satisfied, training the second inference model with the first coefficient and the second coefficient designated as targets for an update; and when it is determined that the predetermined condition is satisfied, training the second inference model with, of the first coefficient and the second coefficient, the second coefficient alone designated as a target for an update.

According to the aspect above, the information processing system, when a first coefficient pertaining to the domain of input data has reached a state associated with convergence, trains a second inference model with a second coefficient designated as a target for an update and with the first coefficient kept from being updated. With this configuration, the information processing system can appropriately promote the convergence of the second coefficient when the first coefficient has reached a state associated with convergence. In this manner, the information processing system can improve the degree of match between an inference result that is based on a first inference model and an inference result that is based on a second inference model.

For example, the training may include, when it is determined that the predetermined condition is satisfied, training the second inference model with the first coefficient fixed.

According to the aspect above, the information processing system, when a first coefficient pertaining to the domain of input data has reached a state associated with convergence, trains a second inference model with a second coefficient designated as a target for an update and with the first coefficient kept being fixed. With this configuration, the information processing system can appropriately promote the convergence of the second coefficient when the first coefficient has reached a state associated with convergence. In this manner, the information processing system can improve the degree of match between an inference result that is based on a first inference model and an inference result that is based on a second inference model.

For example, the first inference model and the second inference model may each be a neural network model.

According to the aspect above, the information processing system uses neural networks as a first inference model and a second inference model, and such a configuration can improve the degree of match between an inference result that is based on the first inference model served by a neural network and an inference result that is based on the second inference model served by a neural network.

For example, the first coefficient may be a coefficient included in a Batch Normalization layer of the second inference model.

According to the aspect above, the information processing system uses a coefficient of a BN layer as a first coefficient. Of features concerning the domain of input data and features concerning the label of input data, the features concerning the domain may be reflected on the coefficient of the BN layer. In this case, the features concerning the label of input data are reflected on a second coefficient. When the coefficient of the BN layer has reached a state associated with convergence, performing the training with the second coefficient on which the features concerning the label are reflected designated as a target for an update can appropriately promote the convergence of the second coefficient. In this manner, the information processing system can further improve the degree of match between an inference result that is based on a first inference model and an inference result that is based on a second inference model.

For example, the second inference model may include a quantizer that quantizes a value input to the Batch Normalization layer, the quantizer being provided at a stage preceding the Batch Normalization layer.

According to the aspect above, the information processing system receives a value quantized by a quantizer input to a BN layer, and thus the normalization process by the BN layer is applied more appropriately. Therefore, the information processing system can more appropriately improve the degree of match between an inference result that is based on a first inference model and an inference result that is based on a second inference model.

For example, the predetermined condition may include: (a) a condition that a total number of times the training of the second inference model has been executed successively with the first coefficient and the second coefficient designated as targets for an update is greater than a threshold value; or (b) a condition that a difference between a current value and a moving average value of the coefficient of the Batch Normalization layer observed during the training is smaller than a threshold value.

According to the aspect above, the information processing system can more easily determine that a first coefficient has reached a state associated with convergence and train a second inference model. Therefore, the information processing system can more appropriately improve the degree of match between an inference result that is based on a first inference model and an inference result that is based on a second inference model.

For example, the error may include: a difference between the first inference result and the second inference result; or a difference between an output result of one intermediate layer among one or more intermediate layers of the first inference model and an output result of, among one or more intermediate layers of the second inference model, one intermediate layer corresponding to the one intermediate layer of the first inference model.

According to the aspect above, the information processing system, by generating a second inference model converted from a first inference model through the distillation method, can more appropriately improve the degree of match between an inference result that is based on the first inference model and an inference result that is based on the second inference model.

For example, the error may include: when the first inference result is input to a determination model that outputs determination information indicating a determination as to whether information input to the determination model is an inference result of the first inference model or an inference result of the second inference model, a difference between the determination information regarding the first inference result input and correct information indicating that the information input is an inference result of the first inference model; and when the second inference result is input to the determination model, a difference between the determination information regarding the second inference result input and correct information indicating that the information input is an inference result of the second inference model.

According to the aspect above, the information processing system, by generating a second inference model converted from a first inference model through the adversarial training method, can more appropriately improve the degree of match between an inference result that is based on the first inference model and an inference result that is based on the second inference model.

For example, the error may include a first error between the first inference result and the second inference result, the information processing method may further include obtaining a third inference result by inputting, into the second inference model, second data prepared to yield an inference result different from an inference result about first data, the first data being the data, and the training may include training the second inference model by machine learning to reduce the first error and to increase a second error calculated from the second inference result and the third inference result.

According to the aspect above, the information processing system, by generating a second inference model converted from a first inference model through the metric learning method, can more appropriately improve the degree of match between an inference result that is based on the first inference model and an inference result that is based on the second inference model.

An information processing system according to one aspect of the present disclosure is an information processing system that includes: a first inferrer that obtains a first inference result by inputting data into a first inference model; a second inferrer that obtains a second inference result by inputting the data into a second inference model; and a trainer that trains the second inference model by machine learning to reduce an error calculated from the first inference result and the second inference result, wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the information processing system further comprises a controller that causes the trainer to, in the training: (a) determine whether a predetermined condition associated with convergence of the first coefficient is satisfied; (b) when it is determined that the predetermined condition is not satisfied, train the second inference model with the first coefficient and the second coefficient designated as targets for an update; and (c) when it is determined that the predetermined condition is satisfied, train the second inference model with, of the first coefficient and the second coefficient, the second coefficient alone designated as a target for an update.

The aspect above provides advantageous effects similar to those provided by the information processing method described above.

A recording medium according to one aspect of the present disclosure is a non-transitory computer-readable recording medium having recorded thereon a program that causes a computer to execute the information processing method above.

The aspect above provides advantageous effects similar to those provided by the information processing method described above.

It is to be noted that general or specific aspects of the above may be implemented in the form of a system, an apparatus, an integrated circuit, a computer program, or a computer readable recording medium, such as a CD-ROM, or through any desired combinations of a system, an apparatus, an integrated circuit, a computer program, and a recording medium.

Hereinafter, some embodiments will be described in concrete terms with reference to the drawings.

It is to be noted that the embodiments described below merely illustrate general or specific examples. The numerical values, the shapes, the materials, the constituent elements, the arrangement positions and the connection modes of the constituent elements, the steps, the orders of the steps, and so forth illustrated in the following embodiments are examples and are not intended to limit the present disclosure. In addition, among the constituent elements in the following embodiments, any constituent elements that are not included in the independent claims expressing the broadest concept are to construed as optional constituent elements.

Embodiment 1

According to the present embodiment, an information processing method, an information processing system, and so on are described that each improve the degree of match between an inference result that is based on an unconverted inference model and an inference result that is based on a converted inference model.

Figure 2:
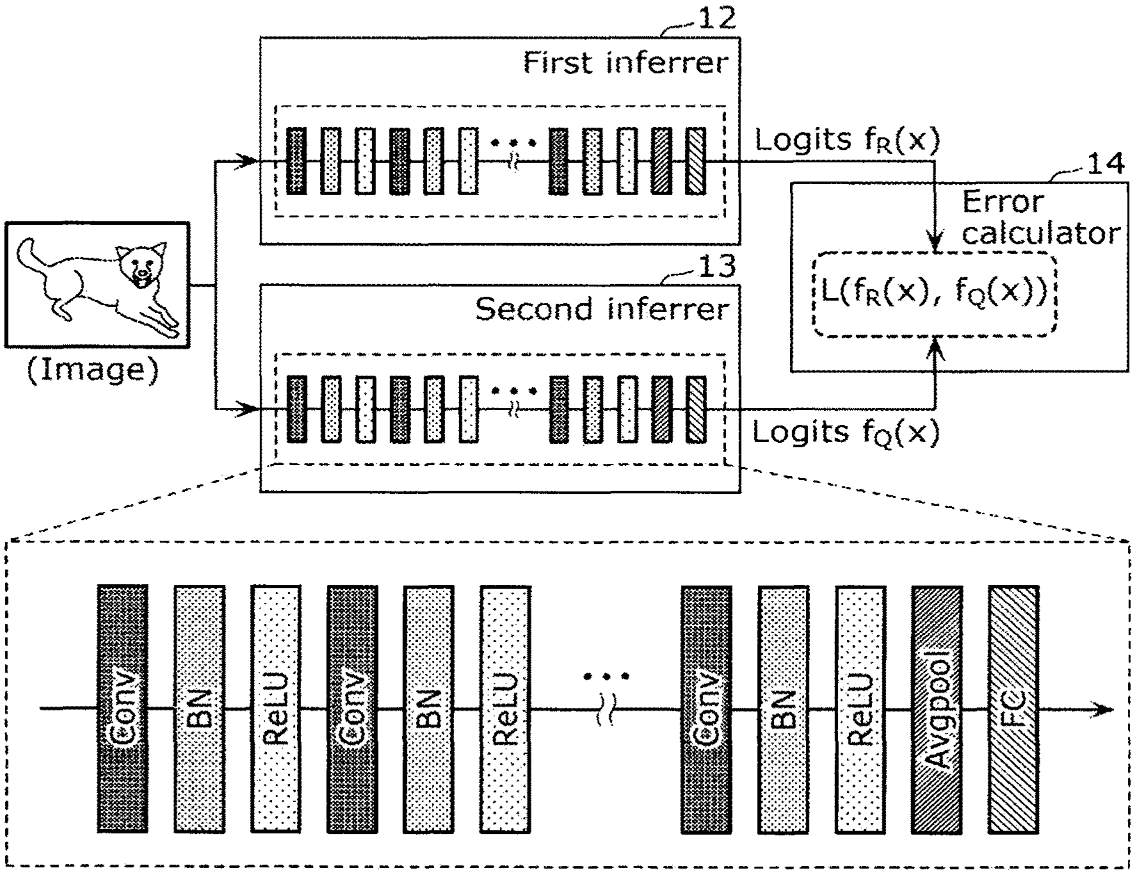
FIG. 2 is an illustration showing, in detail, an inference model included in the information processing system according to Embodiment 1.

FIG. 1 is a block diagram showing a configuration of information processing system 10 according to the present embodiment. FIG. 2 is an illustration showing, in detail, an inference model included in information processing system 10 according to the present embodiment. FIG. 2 omits a part of information processing system 10.

Information processing system 10 is a system that generates a second inference model converted from a first inference model. Herein, a first inference model corresponds to an unconverted inference model, and a second inference model corresponds to a converted inference model. Information processing system 10 improves the degree of match between an inference result that is based on an unconverted inference model and an inference result that is based on a converted inference model.

Various methods are known of generating a second inference model converted from a first inference model, including distillation, adversarial training, or metric learning. In the example described according to the present embodiment, a second inference model converted from a first inference model is generated through a distillation method.

As shown in FIG. 1, information processing system 10 includes obtainer 11, first inferrer 12, second inferrer 13, error calculator 14, trainer 15, and controller 16. Herein, first inferrer 12, second inferrer 13, error calculator 14, trainer 15, and controller 16 may each be implemented as a processor (e.g., a central processing unit (CPU)) executes a predetermined program with the use of a memory. Furthermore, obtainer 11, first inferrer 12, second inferrer 13, error calculator 14, trainer 15, and controller 16 may be provided in a single device or may be distributed over a plurality of devices that are communicably connected to each other.

Obtainer 11 obtains an image from training images 5 and provides the obtained first data to first inferrer 12 and second inferrer 13. Training images 5 are a set of data that information processing system 10 uses to train a second inference model. Training images 5 may be stored in a storage device provided in information processing system 10 or may be stored in a storage device provided in a device external to information processing system 10.

First inferrer 12 includes a first inference model. First inferrer 12 inputs, into the first inference model, an image that obtainer 11 has obtained, performs an inference process on the input image based on the first inference model, and obtains an inference result (also referred to as a first inference result). First inferrer 12 provides an obtained inference result (e.g., Logits $f_R(x)$ shown in FIG. 2) to error calculator 14. Inference is, for example, to recognize an object captured in an image. A first inference model is an inference model trained in advance, for example, by machine learning. A first inference model is, for example, a neural network model (see FIG. 2) and is, more specifically but is not limited to, an inference model of a 32-bit floating point representation.

Instead of an input image, data in a desired format (e.g., data representing sound, text, or the like) can also be used. This applies in the description to follow as well.

Second inferrer 13 includes a second inference model. Second inferrer 13 inputs, into the second inference model, an image that obtainer 11 has obtained, performs an inference process on the input image based on the second inference model, and obtains an inference result (also referred to as a second inference result). Second inferrer 13 provides an obtained inference result (e.g., Logits $f_Q(x)$ shown in FIG. 2) to error calculator 14. A second inference model is in an initial state at the beginning (e.g., in a state in which an initial value is set as a coefficient). A second inference model is an inference model that is trained by information processing system 10 by machine learning.

A second inference model includes, as coefficients to be used for inference by the second inference model, a coefficient (corresponding to a first coefficient) pertaining to the domain of an image input to the second inference model and another coefficient (corresponding to a second coefficient) other than the first coefficient. A second coefficient can also be said to be a coefficient pertaining to a label serving as an inference result of the second inference model.

A second inference model is an inference model presumably lighter than a first inference model. An inference model that is lighter than a first inference model means, more specifically, for example, an inference model with a smaller number of intermediate layers than a first inference model, an inference model with a smaller number of coefficients than a first inference model, or an inference model with a smaller number of bits representing a coefficient than a first inference model.

A second inference model is, for example, a neural network model (see FIG. 2). A second inference model is, more specifically, an inference model of an 8-bit fixed point representation if a first inference model is an inference model of a 32-bit floating point representation. In this case, a first coefficient is a coefficient included in a BN layer of the second inference model. A second inference model may include, in a stage preceding a BN layer, a quantizer that quantizes a value to be input to the BN layer.

A second inference model, which is a neural network model, includes, in addition to a BN layer, for example, a Convolution (ConV) layer, a Rectified Linear Unit (ReLU) layer, an Average Pool (Avgpool) layer, and a Fully Connected (FC) layer (see FIG. 2).

Error calculator 14 obtains a first inference result that first inferrer 12 has obtained and a second inference result that second inferrer 13 has obtained, and calculates an error from the first inference result and the second inference result. Error calculator 14 calculates an error between a first inference result and a second inference result, specifically, with the use of a predetermined error function $L(f_R(x), f_Q(x))$ (see FIG. 2). An error that error calculator 14 calculates may be a difference between a first inference result and a second inference result. Alternatively, an error that error calculator 14 calculates may be a difference between an output result of one intermediate layer among one or more intermediate layers of a first inference model and an output result of, among one or more intermediate layers of a second inference model, one intermediate layer corresponding to the aforementioned one intermediate layer of the first inference model.

Trainer 15 trains a second inference model by machine learning with the use of an error that error calculator 14 has calculated. Specifically, trainer 15, as a general rule, trains a second inference model by machine learning so as to reduce the error that error calculator 14 calculates. Training of a second inference model includes adjusting and updating a coefficient included in the second inference model so as to refine an inference result of the second inference model. Trainer 15 performs the training described above in accordance with the control of controller 16. For example, in response to receiving, from controller 16, the designation of a coefficient to be updated in the training, trainer 15 updates the designated coefficient without updating other coefficients that are not designated (that is, by prohibiting such other coefficients from being updated). In other words, in the case described above, trainer 15 updates the designated coefficient with the other non-designated coefficients kept being fixed.

Controller 16 controls the training performed by trainer 15. Controller 16 determines whether a predetermined condition indicating the convergence of a coefficient included in a second inference model has been satisfied. If controller 16 determines that the predetermined condition is not satisfied, controller 16 causes trainer 15 to train the second inference model with all the coefficients included in the second inference model designated as targets for an update. Meanwhile, if controller 16 determines that the predetermined condition is satisfied, controller 16 causes trainer 15 to train the second inference model with, among the coefficients included in the second inference model, only a second coefficient designated as a target for an update. To be more specific, if controller 16 determines that the predetermined condition is satisfied, controller 16 causes trainer 15 to train the second inference model with a first coefficient kept being fixed.

The predetermined condition above may include, for example, a condition that the number of times the training of the second inference model has been executed successively with all the coefficients included in the second inference model designated as targets for an update is greater than a threshold value. Furthermore, the predetermined condition above may include a condition that the difference between the current value and the moving average value of a coefficient of a Batch Normalization layer observed during training is smaller than a threshold value.

Figure 3:
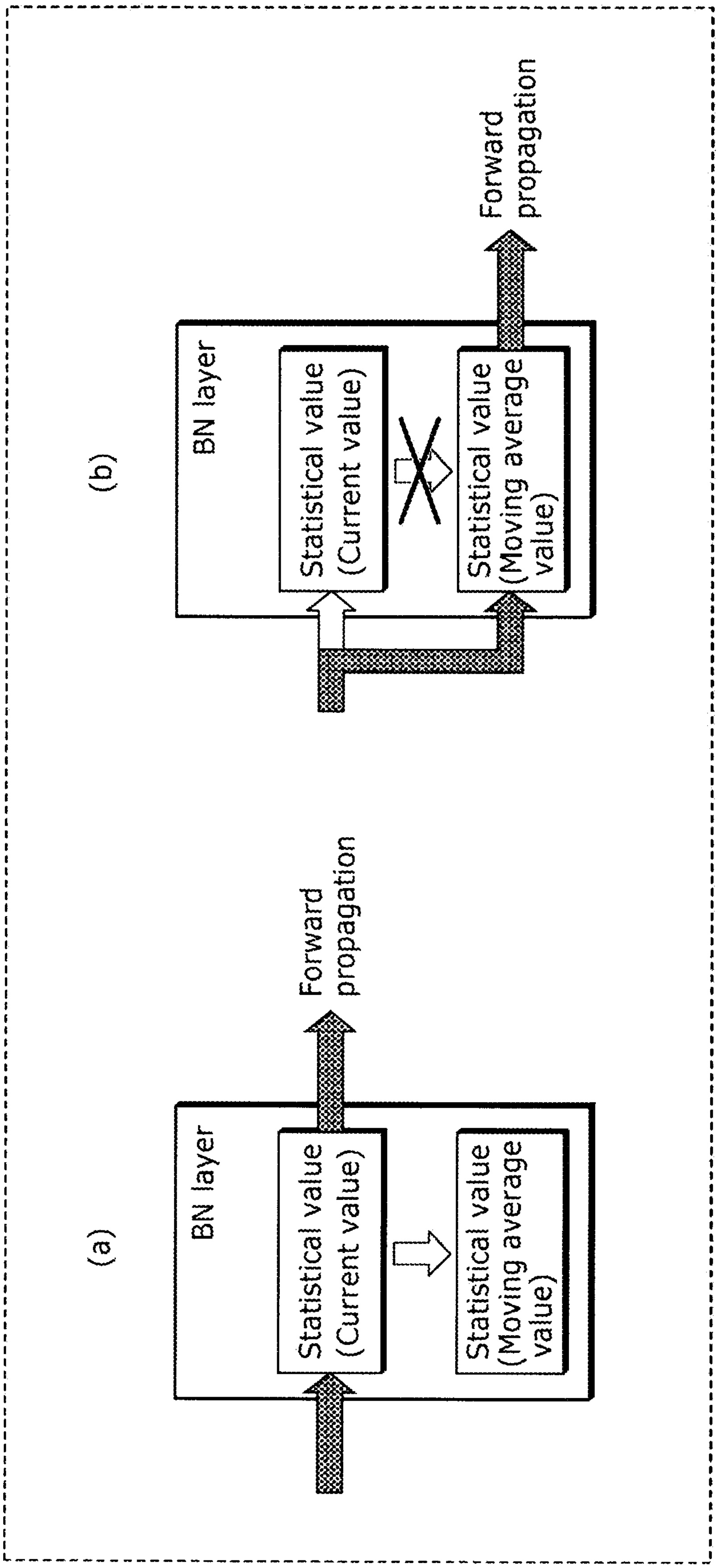
FIG. 3 is an illustration showing a phase of training in the information processing system according to Embodiment 1.

FIG. 3 is an illustration showing a function of a BN layer in information processing system 10 according to the present embodiment.

A BN layer, in inference (i.e., forward propagation) by an inference model, applies a normalization process (also referred to generally as a batch normalization process) on a value input to the BN layer and outputs the result to the next layer. By keeping the distribution of local variables from changing greatly, a BN layer provides advantageous effects of, for example, reducing the time required for training by machine learning or suppressing overtraining.

The normalization process by a BN layer in information processing system 10 differs in Phase 1 than in Phase 2, which are two phases of training. The coefficient of a BN layer is updated in a different mode in Phase 1 than in Phase 2. A normalization process of a BN layer in each phase and the update of a coefficient of a BN layer in each phase will be described below.

In FIG. 3, (a) shows a process pertaining to a BN layer in the training in Phase 1.

In forward propagation, second inferrer 13 applies a normalization process on an input value of a BN layer with the use of the current value of the statistical value (i.e., a batch statistical value) of the input value to the BN layer, and outputs the result to the next layer. The process above is similar to the training of a BN layer according to known techniques.

In forward propagation, second inferrer 13 also calculates a moving average value of the statistical value of the input value to a BN layer. The statistical value of the input value to a BN layer includes mean $\mu$ and variance $\sigma^2$ of the input value.

Moving average value $\mu_t$ of the mean of the input value is calculated through Equation (1) with the use of mean $\mu_{B,t}$ (corresponding to the current value) calculated from the input value when a new input value is input to the BN layer and mean $\mu_{t-1}$ held before the new input value is input. Below, $\alpha$ is a constant representing the magnitude of contribution of mean $\mu_{B,t}$ in the calculation of mean $\mu_t$. Mean $\mu_t$ is updated through Equation (1) each time an input value is input to the BN layer.

[Math. 1]

$$\mu_t=\alpha\cdot\mu_{B,t}+(1-\alpha)\cdot\mu_{t-1} \qquad \text{Equation (1)}$$

Meanwhile, the moving average value of variance $\sigma^2_t$ of the input value is calculated through Equation (2) with the use of variance $\sigma^2_{B,t}$ (corresponding to the current value) calculated from the input value when a new input value is input to a BN layer and variance $\sigma^2_{t-1}$ held before the new input value is input. Below, $\alpha$ is the same as $\alpha$ in Equation (1) above. Variance $\sigma^2_t$ is updated through Equation (2) each time an input value is input to the BN layer.

[Math. 2]

$$\sigma_t^2 = \alpha \cdot \sigma_{B,t}^2 + (1 - \alpha) \cdot \sigma_{t-1}^2 \quad \text{Equation (2)}$$

In the training in Phase 1, the coefficient of a BN layer serves as a target for an update, along with coefficients of other layers included in an inference model.

In FIG. 3, (b) shows a process pertaining to a BN layer in the training in Phase 2.

In forward propagation, second inferrer 13 applies a normalization process on an input value to a BN layer with the use of a moving average value of the statistical value of the input value to the BN layer held at the start of the training in Phase 2, and outputs the result to the next layer.

In forward propagation, second inferrer 13 refrains from updating the moving average value of the statistical value of the input value to the BN layer (that is, second inferrer 13 keeps the moving average value being fixed or prohibits updating the moving average value). In other words, mean μt and variance at used in the training in Phase 2 remain unchanged even when an input value is input to the BN layer and remain being fixed (see Equation (3) and Equation (4)).

[Math. 3]

$$\mu_t = \mu_{t-1} (= \mu) \quad \text{Equation (3)}$$

[Math. 4]

$$\sigma_t^2 = \sigma_{t-1}^2 (= \sigma^2) \quad \text{Equation (4)}$$

In the training in Phase 2, the coefficient of a BN layer is fixed, and coefficients of other layers included in an inference model serve as targets for an update.

A process performed by information processing system 10 configured as described above will now be described.

Figure 4:
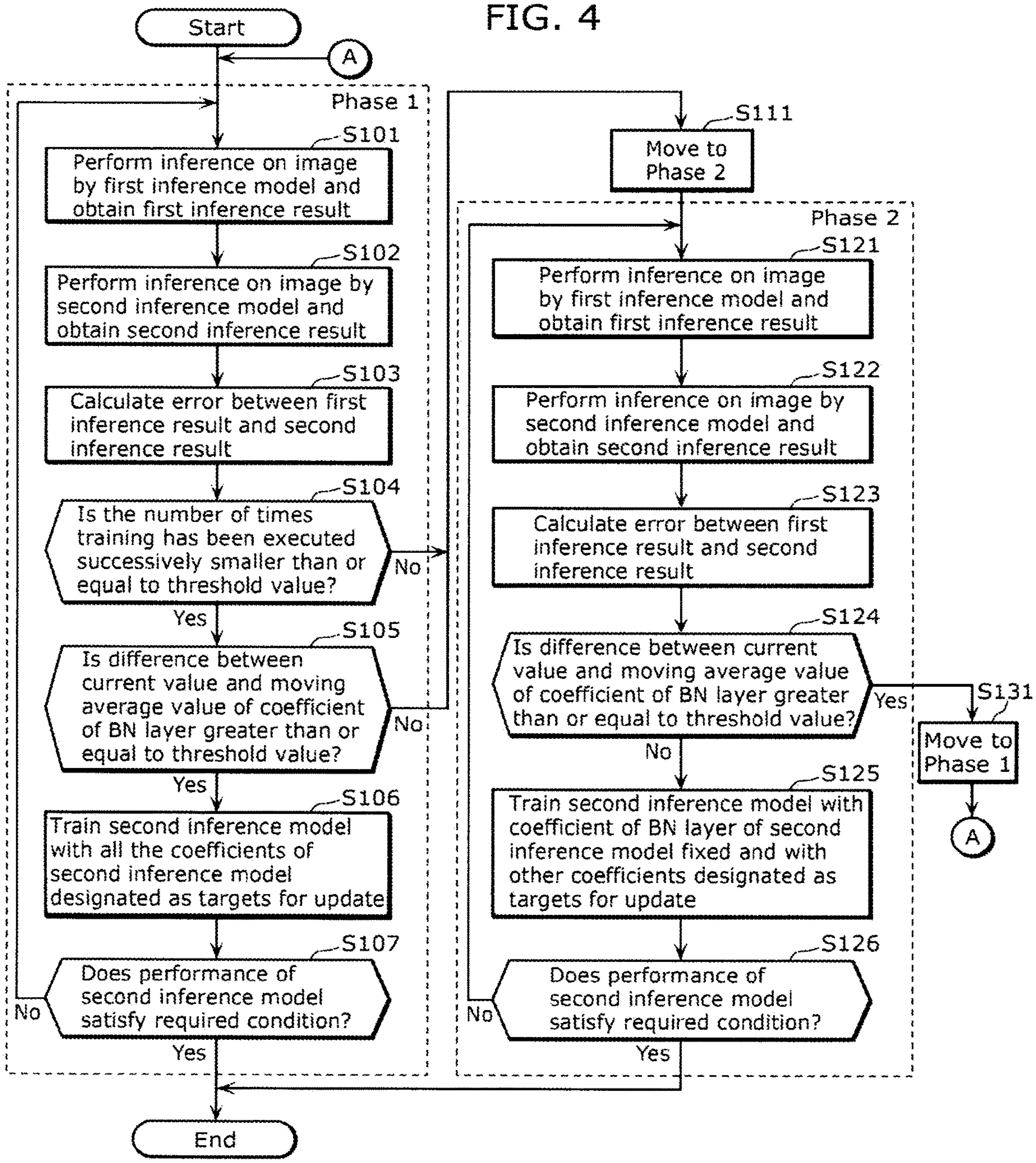
FIG. 4 is a flowchart showing a process performed by the information processing system according to Embodiment 1.

FIG. 4 is a flowchart showing a process performed by information processing system 10 according to the present embodiment.

At step S101, first inferrer 12 inputs an image that obtainer 11 has obtained into a first inference model, performs inference on the input image by the first inference model, and obtains a first inference result.

At step S102, second inferrer 13 inputs the image that obtainer 11 has obtained into a second inference model, performs inference on the input image by the second inference model, and obtains a second inference result.

At step S103, error calculator 14 calculates an error from the first inference result obtained at step S101 and the second inference result obtained at step S102.

At step S104, controller 16 determines whether the number of times the training in Phase 1 (see step S106) has been executed successively is smaller than or equal to a predetermined threshold value. If controller 16 determines that the number of times the training in Phase 1 has been executed successively is smaller than or equal to the predetermined threshold value (Yes at step S104), the process proceeds to step S105. If controller 16 determines that the number of times the training in Phase 1 has been executed successively is not smaller than or equal to the predetermined threshold value (No at step S104), the process proceeds to step S111. The predetermined threshold value is a value corresponding to the number of times the training needs to be executed successively to reach a state in which the batch statistical value has converged sufficiently. The predetermined threshold value is set to a value corresponding to the number of times the training needs to be executed successively to reach a state in which the batch statistical value has converged sufficiently, in accordance with the processing performance of the computer on which information processing system 10 operates, the number of pixels of an input image or the number of input images, or the size of the first inference model or the second inference model (specifically, the number of layers, the number of coefficients, the number of bits representing a coefficient, or the like). A state in which the batch statistical value has converged sufficiently is, for example, a state in which the coefficient changes within 1% of the value of the coefficient when the coefficient is updated.

At step S105, controller 16 determines whether the difference between the current value and the moving average value of the coefficient of the BN layer of the second inference model is greater than or equal to a predetermined threshold value. If controller 16 determines that the difference between the current value and the moving average value of the coefficient of the BN layer is greater than or equal to the predetermined threshold value (Yes at step S105), the process proceeds to step S106. If controller 16 determines that the difference between the current value and the moving average value of the coefficient of the BN layer is not greater than or equal to the predetermined threshold value (No at step S105), the process proceeds to step S111. The predetermined threshold value is a value corresponding to a state in which the batch statistical value has converged sufficiently, and can be set to, for example, 1% of the value of the coefficient.

At step S106, trainer 15 trains the second inference model with the use of the error calculated at step S103, with all the coefficients of the second inference model designated as targets for an update.

At step S107, trainer 15 determines whether the performance of the second inference model satisfies a required condition. If trainer 15 determines that the performance of the second inference model satisfies the required condition (Yes at step S107), the series of processes shown in FIG. 4 is terminated. If trainer 15 determines that the performance of the second inference model does not satisfy the required condition (No at step S107), step S101 is executed again. Whether the performance of the second inference model satisfies the required condition can be determined by, for example, inputting, into the second inference model, a test image whose label (also referred to as a correct label) to be output when the image is input to the inference model is known and by determining whether the label output as the result is identical to the correct label.

At step S111, controller 16 moves the phase of the training to Phase 2 and proceeds to step S121. The phase of the training can be changed, for example, by changing the local variable representing the phase of the training. This applies in the description to follow as well.

At steps S121 to S123, as in steps S101 to S03, information processing system 10 obtains a first inference result and a second inference result and calculates an error between the first inference result and the second inference result.

At step S124, controller 16 determines whether the difference between the current value and the moving average value of the coefficient of the BN layer is greater than or equal to a predetermined threshold value. If controller 16 determines that the difference between the current value and the moving average value of the coefficient of the BN layer is greater than or equal to the predetermined threshold value (Yes at step S124), the process proceeds to step S131. If controller 16 determines that the difference between the current value and the moving average value of the coefficient of the BN layer is not greater than or equal to the predetermined threshold value (No at step S124), the process proceeds to step S125. The predetermined threshold value is a value corresponding to a state in which the batch statistical value has converged sufficiently, and can be set to, for example, 1% of the value of the coefficient.

At step S125, trainer 15 trains the second inference model with the coefficient of the BN layer of the second inference model fixed and with the other coefficients designated as targets for an update. Herein, "the other coefficients" mean the coefficients, among the coefficients of the second inference model, other than the coefficient of the BN layer. The same applies below as well.

At step S126, trainer 15 determines whether the performance of the second inference model satisfies a required condition. If trainer 15 determines that the performance of the second inference model satisfies the required condition (Yes at step S126), the series of processes shown in FIG. 4 is terminated. If trainer 15 determines that the performance of the second inference model does not satisfy the required condition (No at step S126), step S121 is executed again.

At step S131, controller 16 moves the phase of the training to Phase 1 and proceeds to step S101.

Herein, of steps S104 and S105, one of the processes does not have to be executed.

Through the series of processes shown in FIG. 4, information processing system 10 can improve the degree of match between an inference result that is based on an unconverted inference model and an inference result that is based on a converted inference model.

Next, inference system 100 that performs an inference process with the use of a second inference model trained by information processing system 10 will be described.

Figure 5:
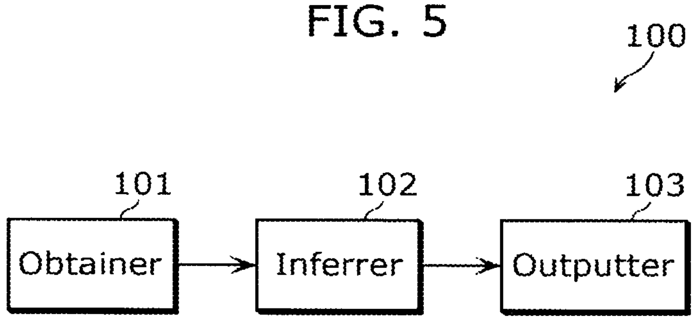
FIG. 5 is a block diagram showing a configuration of an inference system according to Embodiment 1.

FIG. 5 is a block diagram showing a configuration of inference system 100 according to the present embodiment.

Inference system 100 is an information processing system that makes an inference about an image with the use of a second inference model trained by information processing system 10.

As shown in FIG. 5, inference system 100 includes obtainer 101, inferrer 102, and outputter 103.

Obtainer 101 obtains an image. Obtainer 101 may obtain an image from a device external to inference system 100 through communication, or may include an imaging device and obtain an image generated by capturing an image by the imaging device.

Inferrer 102 includes an inference model. Inferrer 102 causes the inference model to make an inference about an image that obtainer 101 has obtained, and obtains an inference result. The inference model included in inferrer 102 is a second inference model trained by information processing system 10.

Outputter 103 outputs an inference result that inferrer 102 has obtained. There is no limitation on the mode in which outputter 103 outputs an inference result. For example, outputter 103 may display information indicating an inference result (letters, an image, or the like) on a display screen, audibly output information indicating an inference result, or transmit information indicating an inference result to a device external to inference system 100 through communication, but these examples are non-limiting.

Figure 6:
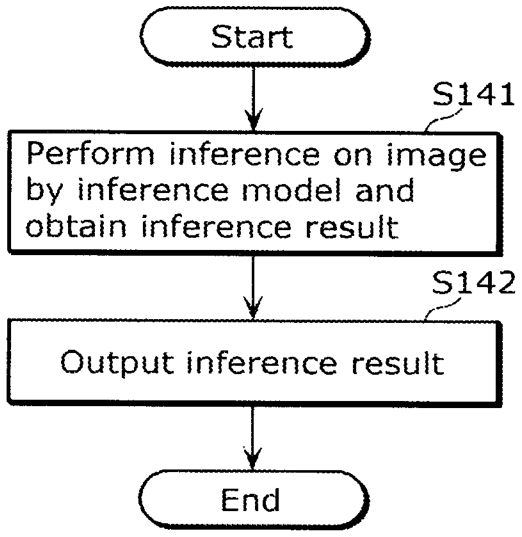
FIG. 6 is a flowchart showing a process performed by the inference system according to Embodiment 1.

FIG. 6 is a flowchart showing a process performed by inference system 100 according to the present embodiment.

At step S141, inferrer 102 performs, by the inference model, inference about an image that obtainer 101 has obtained, and obtains an inference result.

At step S142, outputter 103 outputs the inference result that inferrer 102 has obtained at step S141.

Through the series of processes shown in FIG. 6, information processing system 10 can perform an inference process by a converted inference model generated by information processing system 10.

Figure 7:
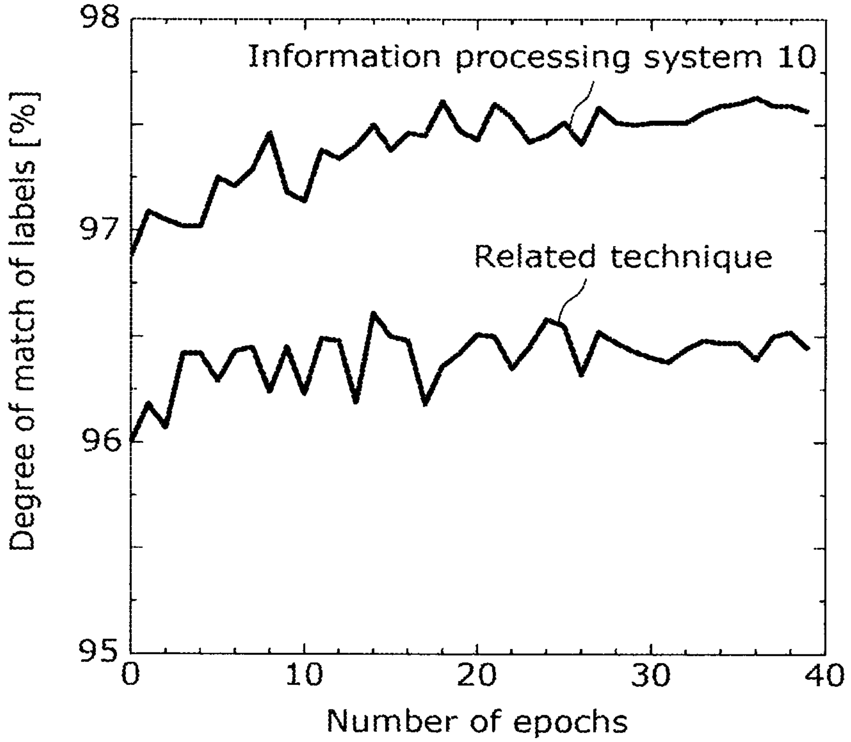
FIG. 7 is an illustration showing the performance of matching inference results by the information processing system according to Embodiment 1.

FIG. 7 is an illustration showing the performance of matching inference results by information processing system 10 according to the present embodiment.

In the graph shown in FIG. 7, the horizontal axis represents the number of epochs, and the vertical axis represents the degree to which a label serving as an inference result of a second inference model matches with a label serving as an inference result of a first inference model.

FIG. 7 shows the degree of match of the labels from a second inference model generated through training by information processing system 10 and the degree of match of the labels from a second inference model generated through training by a related technique. Herein, the related technique is a technique of training a second inference model through a method in which the training of the second inference model is repeated with all the coefficients of the second inference model designated as targets for an update.

As shown in FIG. 7, both the degree of match of the labels from the second inference model generated through training by information processing system 10 and the degree of match of the labels from the second inference model generated through training by the related technique tend to increase along with an increase in the number of epochs.

Apparently, the degree of match of the labels from the second inference model generated through training by information processing system 10 is higher than the degree of match of the labels from the second inference model generated through training by the related technique even while the number of epochs is small, the degree of match of the labels from the second inference model generated through training by information processing system 10 tends to further improve along with an increase in the number of epochs.

Variation of Embodiment 1

In the mode described according to the present variation, a second inference model is obtained by subjecting an inference model trained by a trainer to a predetermined conversion, instead of by training a second inference model by a trainer.

Figure 8:
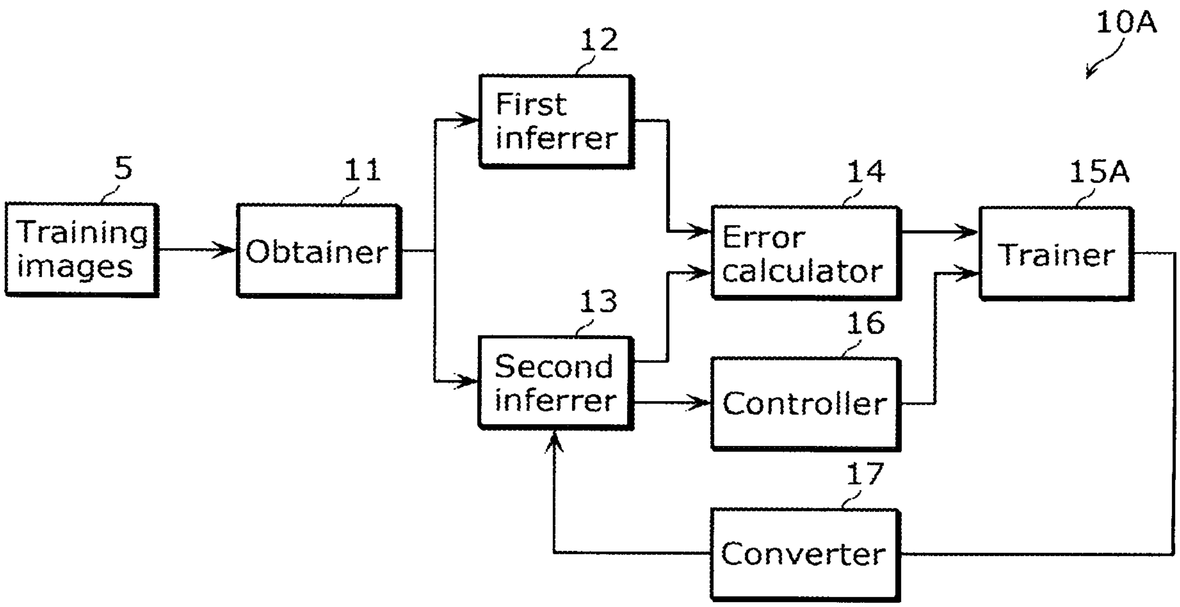
FIG. 8 is a block diagram showing a configuration of an information processing system according to a variation of Embodiment 1.

FIG. 8 is a block diagram showing a configuration of information processing system 10A according to the present variation.

As shown in FIG. 8, information processing system 10A includes obtainer 11, first inferrer 12, second inferrer 13, error calculator 14, trainer 15A, controller 16, and converter 17. Obtainer 11, first inferrer 12, second inferrer 13, error calculator 14, and controller 16 are similar to those according to Embodiment 1.

When compared with information processing system 10 according to Embodiment 1, information processing system 10A differs from information processing system 10 in that information processing system 10A includes trainer 15A in place of trainer 15 and includes converter 17. These differences will be described in detail.

Trainer 15A trains a third inference model by machine learning with the use of an error that error calculator 14 has calculated. Herein, a third inference model is an inference model that turns into a second inference model upon being subjected to a predetermined conversion by converter 17. A third inference model is, for example, a neural network model. A third inference model is, more specifically, an inference model of a 32-bit floating point representation, similar to a first inference model, if the first inference model is an inference model of a 32-bit floating point representation.

Trainer 15A, as a general rule, trains a third inference model by machine learning so as to reduce the error that error calculator 14 has calculated. As with trainer 15, trainer 15A performs the training described above in accordance with the control of controller 16.

Converter 17 generates a second inference model by converting a third inference model trained by trainer 15A. Converter 17 generates a second inference model by subjecting a third inference model to a predetermined conversion. The predetermined conversion is, for example, a conversion of the representation of a coefficient included in a third inference model. The predetermined conversion is, more specifically, to convert an inference model of a 32-bit floating point representation to an inference model of an 8-bit fixed point representation, if a first inference model is an inference model of a 32-bit floating point representation.

Embodiment 2

According to the present embodiment, an information processing method, an information processing system, and so on are described that each improve the degree of match between an inference result that is based on an unconverted inference model and an inference result that is based on a converted inference model. In the example described according to the present embodiment, a second inference model converted from a first inference model is generated through an adversarial training method.

Figure 9:
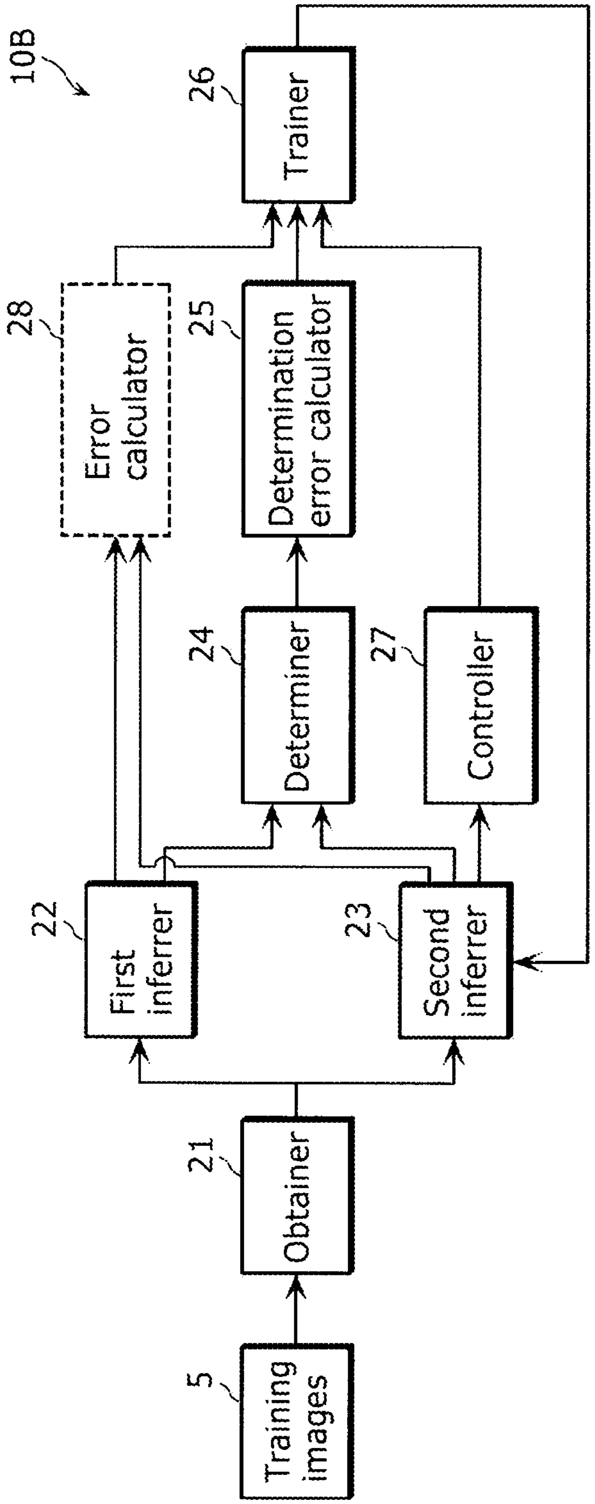
FIG. 9 is a block diagram showing a configuration of an information processing system according to Embodiment 2.

FIG. 9 is a block diagram showing a configuration of information processing system 10B according to the present embodiment.

As shown in FIG. 9, information processing system 10B includes obtainer 21, first inferrer 22, second inferrer 23, determiner 24, determination error calculator 25, trainer 26, controller 27, and error calculator 28. It is to be noted that error calculator 28 is not an essential function.

Obtainer 21 obtains an image from training images 5 and provides the obtained image to first inferrer 22 and second inferrer 23.

First inferrer 22 includes a first inference model. First inferrer 22 inputs, into the first inference model, an image that obtainer 21 has obtained, performs an inference process on the input image based on the first inference model, and obtains an inference result (also referred to as a first inference result).

Second inferrer 23 includes a second inference model. Second inferrer 23 inputs, into the second inference model, an image that obtainer 21 has obtained, performs an inference process on the input image based on the second inference model, and obtains an inference result (also referred to as a second inference result).

Determiner 24 includes a determination model. Determiner 24 obtains information (also referred to as determination information) indicating which of a first inference model and a second inference model an inference result (a first inference result or a second inference result) input to the determination model is based on. A determination model is, for example, a neural network model.

Determination error calculator 25 calculates an error between determination information that determiner 24 has obtained and correct information. Determination error calculator 25 calculates an error between an inference result that first inferrer 22 or second inferrer 23 has obtained and determination information that determiner 24 has obtained with respect to the inference result. If an inference result that first inferrer 22 has obtained has been obtained, an error that determination error calculator 25 calculates includes an error between the inference result that first inferrer 22 has obtained and correct information indicating that the input inference result is an inference result that is based on the first inference model. Meanwhile, if an inference result that second inferrer 23 has obtained has been obtained, an error that determination error calculator 25 calculates includes an error between the inference result that second inferrer 23 has obtained and correct information indicating that the input inference result is an inference result that is based on the second inference model.

Trainer 26 trains a second inference model by machine learning with the use of an error that determination error calculator 25 has calculated. Specifically, trainer 26, as a general rule, trains a second inference model by machine learning so as to reduce the error that determination error calculator 25 calculates. Trainer 26 performs the training described above in accordance with the control of error calculator 28. For example, in response to receiving, from error calculator 28, the designation of a coefficient to be updated in the training, trainer 26 updates the designated coefficient without updating other coefficients that are not designated (that is, by prohibiting such other coefficients from being updated). In other words, in the case described above, trainer 26 updates the designated coefficient with the other non-designated coefficients kept being fixed.

Controller 27 controls the training performed by trainer 26. Controller 27 determines whether a predetermined condition indicating the convergence of a coefficient included in a second inference model has been satisfied. If controller 27 determines that the predetermined condition is not satisfied, controller 27 causes trainer 26 to train the second inference model with all the coefficients included in the second inference model designated as targets for an update. Meanwhile, if controller 27 determines that the predetermined condition is satisfied, controller 27 causes trainer 26 to train the second inference model with, among the coefficients included in the second inference model, only the second coefficient designated as a target for an update. To be more specific, if controller 27 determines that the predetermined condition is satisfied, trainer 26 causes trainer 26 to train the second inference model with the first coefficient kept being fixed. The predetermined condition is similar to the predetermined condition that controller 16 uses according to Embodiment 1.

Error calculator 28 is similar to error calculator 14 according to Embodiment 1. Error calculator 28 is a functional unit that obtains a first inference result and a second inference result and calculates an error from the first inference result and the second inference result. Error calculator 28 provides a calculated error to trainer 26. In this case, trainer 26 trains a second inference model by machine learning with the further use of the error provided by error calculator 28. Specifically, trainer 26 trains a second inference model by machine learning so as to reduce the error that determination error calculator 25 calculates as well as the error that error calculator 28 calculates.

Figure 10:
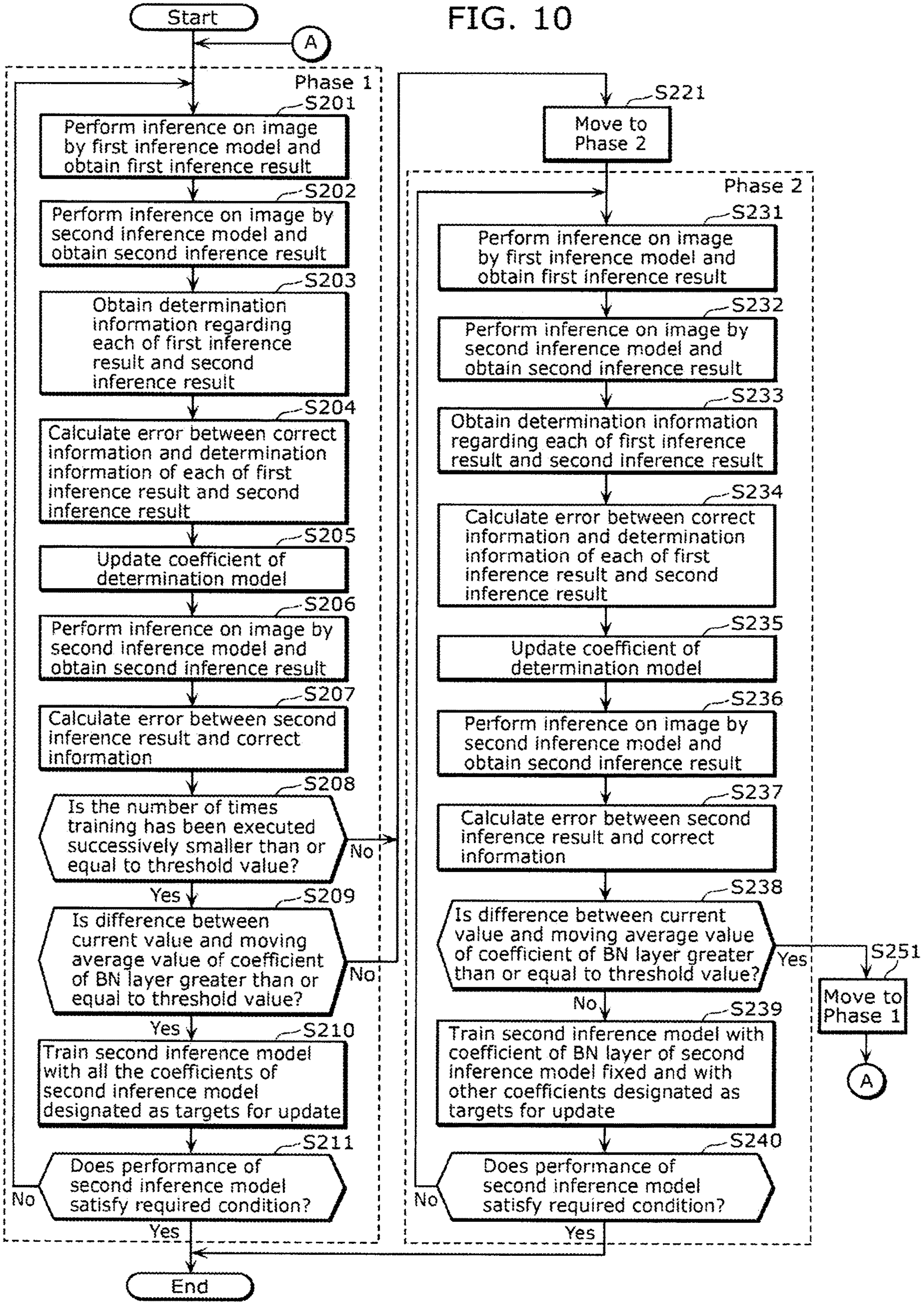
FIG. 10 is a flowchart showing a process performed by the information processing system according to Embodiment 2.

FIG. 10 is a flowchart showing a process performed by information processing system 10B according to the present embodiment.

At step S201, first inferrer 22 inputs an image that obtainer 21 has obtained into a first inference model, performs inference on the input image by the first inference model, and obtains a first inference result.

At step S202, second inferrer 23 inputs the image that obtainer 21 has obtained into a second inference model, performs inference on the input image by the second inference model, and obtains a second inference result.

At step S203, determiner 24 inputs the first inference result obtained at step S201 into a determination model and obtains determination information indicating which of the first inference model and the second inference model the input inference result is based on. Furthermore, determiner 24 inputs the second inference result obtained at step S202 into the determination model and obtains determination information indicating which of the first inference model and the second inference model the input inference result is based on.

At step S204, determination error calculator 25 calculates an error between the determination information obtained with respect to the first inference result at step S203 and correct information indicating that the inference result input to the determination model is an inference result that is based on the first inference model. Furthermore, determination error calculator 25 calculates an error between the determination information obtained with respect to the second inference result at step S203 and correct information indicating that the inference result input to the determination model is an inference result that is based on the second inference model.

At step S205, trainer 26 updates a coefficient of the determination model with the use of the error calculated at step S204.

At step S206, second inferrer 23 inputs an image into the second inference model, performs inference on the input image by the second inference model, and obtains a second inference result.

At step S207, determination error calculator 25 calculates an error between the second inference result obtained at step S206 and correct information indicating that the inference result input to the determination model is an inference result that is based on the first inference model.

At step S208, controller 27 determines whether the number of times the training in Phase 1 (see step S210) has been executed successively is smaller than or equal to a predetermined threshold value. If controller 27 determines that the number of times the training in Phase 1 has been executed successively is smaller than or equal to the threshold value (Yes at step S208), the process proceeds to step S209. If controller 27 determines that the number of times the training in Phase 1 has been executed successively is not smaller than or equal to the threshold value (No at step S208), the process proceeds to step S221. The predetermined threshold value is similar to the one used at step S104 according to Embodiment 1.

At step S209, controller 27 determines whether the difference between the current value and the moving average value of the coefficient of the BN layer of the second inference model is greater than or equal to a predetermined threshold value. If controller 27 determines that the difference between the current value and the moving average value of the coefficient of the BN layer of the second inference model is greater than or equal to the predetermined threshold value (Yes at step S209), the process proceeds to step S210. If controller 27 determines that the difference between the current value and the moving average value of the coefficient of the BN layer of the second inference model is not greater than or equal to the predetermined threshold value (No at step S209), the process proceeds to step S221. The predetermined threshold value is similar to the one used at step S105 according to Embodiment 1.

At step S210, trainer 26 trains the second inference model with the use of the error calculated at step S207, with all the coefficients of the second inference model designated as targets for an update.

At step S211, trainer 26 determines whether the performance of the second inference model satisfies a required condition. If trainer 26 determines that the performance of the second inference model satisfies the required condition (Yes at step S211), the series of processes shown in FIG. 10 is terminated. If trainer 26 determines that the performance of the second inference model does not satisfy the required condition (No at step S211), step S201 is executed again.

At step S221, controller 27 moves the phase of the training to Phase 2 and proceeds to step S231.

At steps S231 to S237, as in steps S201 to S207, information processing system 10B obtains a first inference result and a second inference result, updates a coefficient of the determination model with the use of an error between the determination information and correct information concerning the first inference result and the second inference result, and calculates an error between the second inference result and the correct information.

At step S238, controller 27 determines whether the difference between the current value and the moving average value of the coefficient of the BN layer of the second inference model is greater than or equal to a threshold value. If controller 27 determines that the difference between the current value and the moving average value of the coefficient of the BN layer of the second inference model is greater than or equal to the threshold value (Yes at step S238), the process proceeds to step S251. If controller 27 determines that the difference between the current value and the moving average value of the coefficient of the BN layer of the second inference model is not greater than or equal to the threshold value (No at step S238), the process proceeds to step S239. The threshold value is similar to the one used at step S124 according to Embodiment 1.

At step S239, trainer 26 trains the second inference model with the coefficient of the BN layer of the second inference model fixed and with the other coefficients designated as targets for an update.

At step S240, trainer 26 determines whether the performance of the second inference model satisfies a required condition. If trainer 26 determines that the performance of the second inference model satisfies the required condition (Yes at step S240), the series of processes shown in FIG. 10 is terminated. If trainer 26 determines that the performance of the second inference model does not satisfy the required condition (No at step S240), step S231 is executed again.

At step S251, controller 27 moves the phase of the training to Phase 1 and proceeds to step S201.

Herein, of steps S208 and S209, one of the processes does not have to be executed.

Through the series of processes shown in FIG. 10, information processing system 10B can improve the degree of match between an inference result that is based on an unconverted inference model and an inference result that is based on a converted inference model.

As with the variation of Embodiment 1, in one possible mode, a second inference model may be obtained by subjecting an inference model trained by trainer 26 to a predetermined conversion by converter 17, instead of by training a second inference model by trainer 26.

Embodiment 3

According to the present embodiment, an information processing method, an information processing system, and so on are described that each improve the degree of match between an inference result that is based on an unconverted inference model and an inference result that is based on a converted inference model. In the example described according to the present embodiment, a second inference model converted from a first inference model is generated through a metric learning method.

Figure 11:
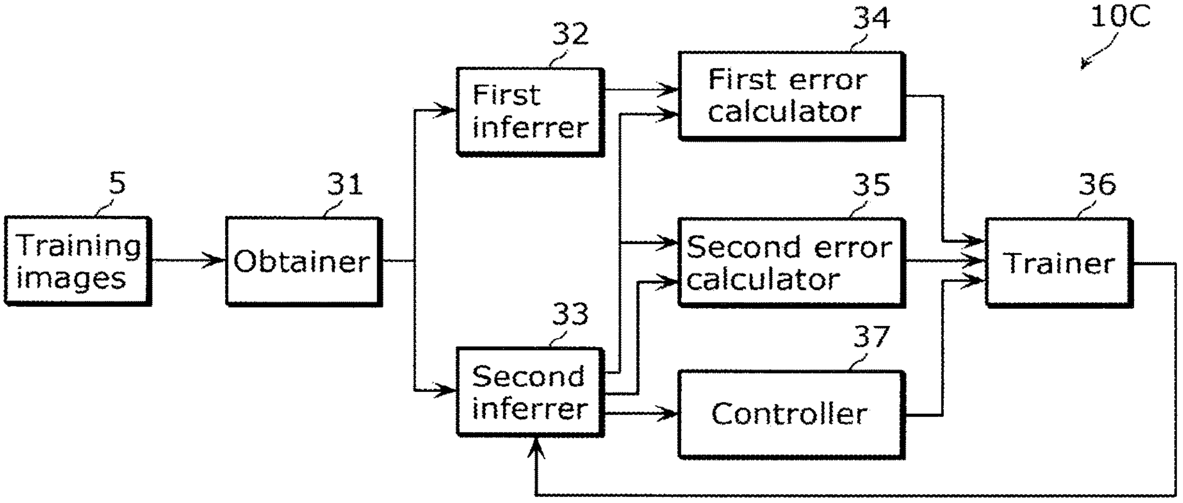
FIG. 11 is a block diagram showing a configuration of an information processing system according to Embodiment 3.

FIG. 11 is a block diagram showing a configuration of information processing system 10C according to the present embodiment.

As shown in FIG. 11, information processing system 10C includes obtainer 31, first inferrer 32, second inferrer 33, first error calculator 34, second error calculator 35, trainer 36, and controller 37.

Obtainer 31 obtains, from training images 5, a first image belonging to a first type and a second image belonging to a second type. Obtainer 31 provides an obtained first image to first inferrer 32 and second inferrer 33 and provides an obtained second image to second inferrer 33.

Herein, a type of a set of images means the images' attribute that causes an inference model, when the images are input thereto, to output an identical inference result. In other words, images of the first type and images of the second type are images prepared such that the images of the first type and the images of the second type produce different inference results. For example, images of the first type and images of the second type are images prepared such that the images of the first type and the images of the second type produce different labels as their inference results.

First inferrer 32 includes a first inference model. First inferrer 32 performs an inference process on an input image based on the first inference model and obtains an inference result. Specifically, first inferrer 32 performs an inference process on a first image provided from obtainer 31 based on the first inference model, and obtains an inference result (also referred to as a first inference result). First inferrer 32 provides an obtained first inference result to first error calculator 34.

Second inferrer 33 includes a second inference model. Second inferrer 33 performs an inference process on an input image based on the second inference model and obtains an inference result. Specifically, second inferrer 33 performs an inference process on a first image provided from obtainer 31 based on the second inference model, and obtains an inference result (also referred to as a second inference result). Second inferrer 33 provides an obtained second inference result to first error calculator 34 and second error calculator 35.

Furthermore, second inferrer 33 performs an inference process on a second image provided from obtainer 31 based on the second inference model, and obtains an inference result (also referred to as a third inference result). Second inferrer 33 provides an obtained third inference result to second error calculator 35.

First error calculator 34 calculates a first error from a first inference result provided from first inferrer 32 and a second inference result provided from second inferrer 33. The method of calculating a first error is similar to the method of calculating an error by error calculator 14 according to Embodiment 1.

Second error calculator 35 calculates a second error from a second inference result and a third inference result provided from second inferrer 33. The method of calculating a second error is similar to the method of calculating an error by error calculator 14 according to Embodiment 1.

Trainer 36 trains a second inference model by machine learning with the use of a first error that first error calculator 34 has calculated and a second error that second error calculator 35 has calculated. Specifically, trainer 36, as a general rule, trains a second inference model by machine learning so as to reduce the first error that first error calculator 34 calculates and to increase the second error that second error calculator 35 calculates. Trainer 36 performs the training described above in accordance with the control of controller 37. For example, in response to receiving, from controller 37, the designation of a coefficient to be updated in the training, trainer 36 updates the designated coefficient without updating the other coefficients that are not designated (that is, by prohibiting such other coefficients from being updated). In other words, in the case described above, trainer 36 updates the designated coefficient with the other non-designated coefficients kept being fixed.

Controller 37 controls the training performed by trainer 36. Controller 37 determines whether a predetermined condition indicating the convergence of a coefficient included in a second inference model has been satisfied. If controller 37 determines that the predetermined condition is not satisfied, controller 37 causes trainer 36 to train the second inference model with all the coefficients included in the second inference model designated as targets for an update. Meanwhile, if controller 37 determines that the predetermined condition is satisfied, controller 37 causes trainer 36 to train the second inference model with, among the coefficients included in the second inference model, only the second coefficient designated as a target for an update. To be more specific, if controller 37 determines that the predetermined condition is satisfied, controller 37 causes controller 37 to train the second inference model with the first coefficient kept being fixed. The predetermined condition is similar to the predetermined condition that controller 16 uses according to Embodiment 1.

Figure 12:
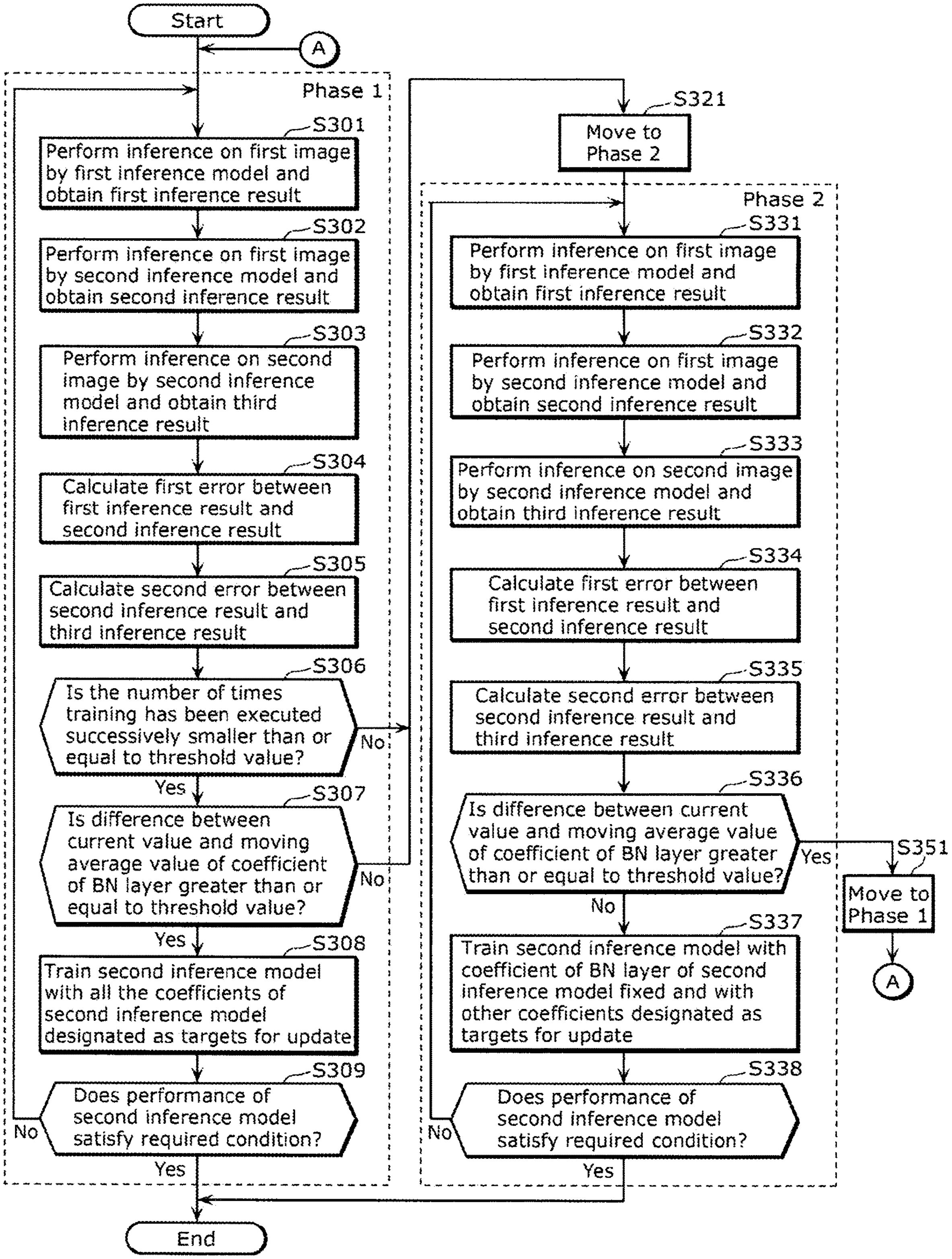
FIG. 12 is a flowchart showing a process performed by the information processing system according to Embodiment 3.

FIG. 12 is a flowchart showing a process performed by information processing system 10C according to the present embodiment.

At step S301, first inferrer 32 inputs a first image that obtainer 31 has obtained into a first inference model, performs inference on the input first image by the first inference model, and obtains a first inference result.

At step S302, second inferrer 33 inputs the first image that obtainer 31 has obtained into a second inference model, performs inference on the input first image by the second inference model, and obtains a second inference result.

At step S303, second inferrer 33 inputs a second image that obtainer 31 has obtained into the second inference model, performs inference on the input second image by the second inference model, and obtains a third inference result.

At step S304, first error calculator 34 calculates a first error from the first inference result obtained at step S301 and the second inference result obtained at step S302.

At step S305, first error calculator 34 calculates a second error from the second inference result obtained at step S302 and the third inference result obtained at step S303.

At step S306, controller 37 determines whether the number of times the training in Phase 1 (see step S308) has been executed successively is smaller than or equal to a predetermined threshold value. If controller 37 determines that the number of times the training in Phase 1 has been executed successively is smaller than or equal to the threshold value (Yes at step S306), the process proceeds to step S307. If controller 37 determines that the number of times the training in Phase 1 has been executed successively is not smaller than equal to the threshold value (No at step S306), the process proceeds to step S321. The predetermined threshold value is similar to the one used at step S104 according to Embodiment 1.

At step S307, controller 37 determines whether the difference between the current value and the moving average value of the coefficient of the BN layer of the second inference model is greater than or equal to a predetermined threshold value. If controller 37 determines that the difference between the current value and the moving average value of the coefficient of the BN layer is greater than or equal to the predetermined threshold value (Yes at step S307), the process proceeds to step S308. If controller 37 determines that the difference between the current value and the moving average value of the coefficient of the BN layer is not greater than or equal to the predetermined threshold value (No at step S307), the process proceeds to step S321. The predetermined threshold value is similar to the one used at step S105 according to Embodiment 1.

At step S308, trainer 36 trains the second inference model with the use of the first error calculated at step S304 and the second error calculated at step S305, with all the coefficients of the second inference model designated as targets for an update.

At step S309, trainer 36 determines whether the performance of the second inference model satisfies a required condition. If trainer 36 determines that the performance of the second inference model satisfies the required condition (Yes at step S309), the series of processes shown in FIG. 12 is terminated. If trainer 36 determines that the performance of the second inference model does not satisfy the required condition (No at step S309), step S301 is executed again.

At step S321, controller 37 moves the phase of the training to Phase 2 and proceeds to step S331.

At steps S331 to S335, as in steps S301 to S305, information processing system 10C obtains a first inference result, a second inference result, and a third inference result and calculates a first error and a second error.

At step S336, controller 37 determines whether the difference between the current value and the moving average value of the coefficient of the BN layer of the second inference model is greater than or equal to a predetermined threshold value. If controller 37 determines that the difference between the current value and the moving average value of the coefficient of the BN layer is greater than or equal to the predetermined threshold value (Yes at step S336), the process proceeds to step S351. If controller 37 determines that the difference between the current value and the moving average value of the coefficient of the BN layer is not greater than or equal to the predetermined threshold value (No at step S336), the process proceeds to step S337. The predetermined threshold value is similar to the one used at step S105 according to Embodiment 1.

At step S337, trainer 36 trains the second inference model with the coefficient of the BN layer of the second inference model fixed and with the other coefficients designated as targets for an update.

At step S338, trainer 36 determines whether the performance of the second inference model satisfies a required condition. If trainer 36 determines that the performance of the second inference model satisfies the required condition (Yes at step S338), the series of processes shown in FIG. 12 is terminated. If trainer 36 determines that the performance of the second inference model does not satisfy the required condition (No at step S338), step S331 is executed again.

At step S351, controller 37 moves the phase of the training to Phase 1 and proceeds to step S301.

Herein, of steps S306 and S307, one of the processes does not have to be executed.

Through the series of processes shown in FIG. 12, information processing system 10C can improve the degree of match between an inference result that is based on an unconverted inference model and an inference result that is based on a converted inference model.

As with the variation of Embodiment 1, in one possible mode, a second inference model may be obtained by subjecting an inference model trained by trainer 36 to a predetermined conversion by converter 17, instead of by training a second inference model by trainer 36.

As described above, the information processing system according to any of the foregoing embodiments, when a first coefficient pertaining to the domain of input data has reached a state associated with convergence, trains a second inference model with a second coefficient designated as a target for an update and with the first coefficient kept from being updated. With this configuration, the information processing system can appropriately promote the convergence of the second coefficient when the first coefficient has reached a state associated with convergence. In this manner, the information processing system can improve the degree of match between an inference result that is based on a first inference model and an inference result that is based on a second inference model.

Furthermore, the information processing system, when a first coefficient pertaining to the domain of input data has reached a state associated with convergence, trains a second inference model with a second coefficient designated as a target for an update and with the first coefficient kept being fixed. With this configuration, the information processing system can appropriately promote the convergence of the second coefficient when the first coefficient has reached a state associated with convergence. In this manner, the information processing system can improve the degree of match between an inference result that is based on a first inference model and an inference result that is based on a second inference model.

Furthermore, the information processing system uses neural networks as a first inference model and a second inference model, and such a configuration can improve the degree of match between an inference result that is based on the first inference model served by a neural network and an inference result that is based on the second inference model served by a neural network.

Furthermore, the information processing system uses a coefficient of a BN layer as a first coefficient. Of features concerning the domain of input data and features concerning the label of input data, the features concerning the domain may be reflected on the coefficient of the BN layer. In this case, the features concerning the label of input data are reflected on a second coefficient. When the coefficient of the BN layer has reached a state associated with convergence, performing the training with the second coefficient on which the features concerning the label are reflected designated as a target for an update can appropriately promote the convergence of the second coefficient. In this manner, the information processing system can further improve the degree of match between an inference result that is based on a first inference model and an inference result that is based on a second inference model.

Furthermore, the information processing system receives a value quantized by a quantizer input to a BN layer, and thus the normalization process by the BN layer is applied more appropriately. Therefore, the information processing system can more appropriately improve the degree of match between an inference result that is based on a first inference model and an inference result that is based on a second inference model.

Furthermore, the information processing system can more easily determine that a first coefficient has reached a state associated with convergence and train a second inference model. Therefore, the information processing system can more appropriately improve the degree of match between an inference result that is based on a first inference model and an inference result that is based on a second inference model.

Furthermore, the information processing system, by generating a second inference model converted from a first inference model through the distillation method, can more appropriately improve the degree of match between an inference result that is based on the first inference model and an inference result that is based on the second inference model.

Furthermore, the information processing system, by generating a second inference model converted from a first inference model through the adversarial training method, can more appropriately improve the degree of match between an inference result that is based on the first inference model and an inference result that is based on the second inference model.

Furthermore, the information processing system, by generating a second inference model converted from a first inference model through the metric learning method, can more appropriately improve the degree of match between an inference result that is based on the first inference model and an inference result that is based on the second inference model.

In the foregoing embodiments, the constituent elements may each be implemented by dedicated hardware or may each be implemented through the execution of a software program suitable for a corresponding constituent element. The constituent elements may each be implemented as a program executing unit, such as a CPU or a processor, reads out a software program recorded on a recording medium, such as a hard disk or a semiconductor memory, and executes the software program. Herein, software that implements the systems and so on of the foregoing embodiments is a program such as the one described below.

Specifically, this program is a program that causes a computer to execute an information processing method that includes: obtaining a first inference result by inputting data into a first inference model; obtaining a second inference result by inputting the data into a second inference model; and training the second inference model by machine learning to reduce an error calculated from the first inference result and the second inference result; wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the training includes: determining whether a predetermined condition associated with convergence of the first coefficient is satisfied; when it is determined that the predetermined condition is not satisfied, training the second inference model with the first coefficient and the second coefficient designated as targets for an update; and when it is determined that the predetermined condition is satisfied, training the second inference model with, of the first coefficient and the second coefficient, the second coefficient alone designated as a target for an update.

Thus far, the information processing method and so forth according to one or more aspects have been described based on the embodiments, but the present disclosure is not limited to these embodiments. Unless departing from the spirit of the present disclosure, an embodiment obtained by making various modifications that are conceivable by a person skilled in the art to the present embodiments or an embodiment obtained by combining the constituent elements in the different embodiments may also be encompassed by the scope of the one or more aspects.

INDUSTRIAL APPLICABILITY

The present disclosure can be used in an information processing system that converts an inference model.

The invention claimed is:

1. An information processing method comprising:

obtaining a first inference result by inputting data into a first inference model;

obtaining a second inference result by inputting the data into a second inference model; and training the second inference model by machine learning to reduce an error calculated from the first inference result and the second inference result, wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the training includes:

determining whether a predetermined condition associated with convergence of the first coefficient is satisfied;

when it is determined that the predetermined condition is not satisfied, training the second inference model with the first coefficient and the second coefficient designated as targets for an update; and when it is determined that the predetermined condition is satisfied, training the second inference model with, of the first coefficient and the second coefficient, the second coefficient alone designated as a target for an update.

2. The information processing method according to claim 1, wherein the training includes, when it is determined that the predetermined condition is satisfied, training the second inference model with the first coefficient fixed.

3. The information processing method according to claim 1, wherein the first inference model and the second inference model are each a neural network model.

4. The information processing method according to claim 3, wherein the first coefficient is a coefficient included in a Batch Normalization layer of the second inference model.

5. The information processing method according to claim 4, wherein the second inference model includes a quantizer that quantizes a value input to the Batch Normalization layer, the quantizer being provided at a stage preceding the Batch Normalization layer.

6. The information processing method according to claim 5, wherein the predetermined condition includes:

(a) a condition that a total number of times the training of the second inference model has been executed successively with the first coefficient and the second coefficient designated as targets for an update is greater than a threshold value; or (b) a condition that a difference between a current value and a moving average value of the coefficient of the Batch Normalization layer observed during the training is smaller than a threshold value.

7. The information processing method according to claim 1, wherein the error includes:

a difference between the first inference result and the second inference result; or a difference between an output result of one intermediate layer among one or more intermediate layers of the first inference model and an output result of, among one or more intermediate layers of the second inference model, one intermediate layer corresponding to the one intermediate layer of the first inference model.

8. The information processing method according to claim 1, wherein the error includes:

when the first inference result is input to a determination model that outputs determination information indicating a determination as to whether information input to the determination model is an inference result of the first inference model or an inference result of the second inference model, a difference between the determination information regarding the first inference result input and correct information indicating that the information input is an inference result of the first inference model; and when the second inference result is input to the determination model, a difference between the determination information regarding the second inference result input and correct information indicating that the information input is an inference result of the second inference model.

9. The information processing method according to claim 1, wherein the error includes a first error between the first inference result and the second inference result, the information processing method further comprises obtaining a third inference result by inputting, into the second inference model, second data prepared to yield an inference result different from an inference result about first data, the first data being the data, and the training includes training the second inference model by machine learning to reduce the first error and to increase a second error calculated from the second inference result and the third inference result.

10. An information processing system comprising:

a processor;

a first inferrer that obtains, by the processor, a first inference result by inputting data into a first inference model;

a second inferrer that obtains, by the processor, a second inference result by inputting the data into a second inference model; and a trainer that trains, by the processor, the second inference model by machine learning to reduce an error calculated from the first inference result and the second inference result, wherein the second inference model includes (a) a first coefficient used for inference by the second inference model, the first coefficient pertaining to a domain of input data input to the second inference model, and (b) a second coefficient used for inference by the second inference model, the second coefficient being a coefficient other than the first coefficient, and the information processing system further comprises a controller that causes, by the processor, the trainer to, in the training:

(a) determine whether a predetermined condition associated with convergence of the first coefficient is satisfied;

(b) when it is determined that the predetermined condition is not satisfied, train the second inference model with the first coefficient and the second coefficient designated as targets for an update; and (c) when it is determined that the predetermined condition is satisfied, train the second inference model with, of the first coefficient and the second coefficient, the second coefficient alone designated as a target for an update.

11. A non-transitory computer-readable recording medium having recorded thereon program that causes a computer to execute the information processing method according to claim 1.

* * * * *